United States Patent

[11] 3,523,519

| [72] | Inventor | Eldon Hostetler<br>Middlebury, Indiana |
|---|---|---|
| [21] | Appl. No. | 679,691 |
| [22] | Filed | Nov. 1, 1967 |
| [45] | Patented | Aug. 11, 1970 |
| [73] | Assignee | Chore-Time Equipment, Inc.<br>Milford, Indiana<br>a Corp. of Indiana |

[54] POULTRY FEEDING APPARATUS
14 Claims, 11 Drawing Figs.

[52] U.S. Cl. ................................................ 119/18,
119/52, 119/53.5
[51] Int. Cl. ....................................................... A01k 05/00
[50] Field of Search ........................................... 119/52–54,
18, 61, 52, 53.5

[56] References Cited
UNITED STATES PATENTS

| 1,368,553 | 2/1921 | Frost ............................. | 119/53.5 |
| 1,837,668 | 12/1931 | Oberly .......................... | 119/53.5 |
| 2,494,950 | 1/1950 | Lee ............................... | 119/53.5 |
| 2,827,877 | 3/1958 | Hart ............................. | 119/61 |
| 2,914,024 | 11/1959 | Hobbs .......................... | 119/54 |

Primary Examiner— Hugh R. Chamblee
Attorney—Olson, Trexler, Wolters and Bushnell ABSTRACT: There is disclosed an animal or poultry feeder mounted in association with poultry cages. The feeder includes a feed conveyor mounted along one side of the cages and spaced feed cups or containers for receiving feed dropping from openings in the conveyor. Baffles are pivotally mounted in the containers for controlling the amount of feed in each of the containers.

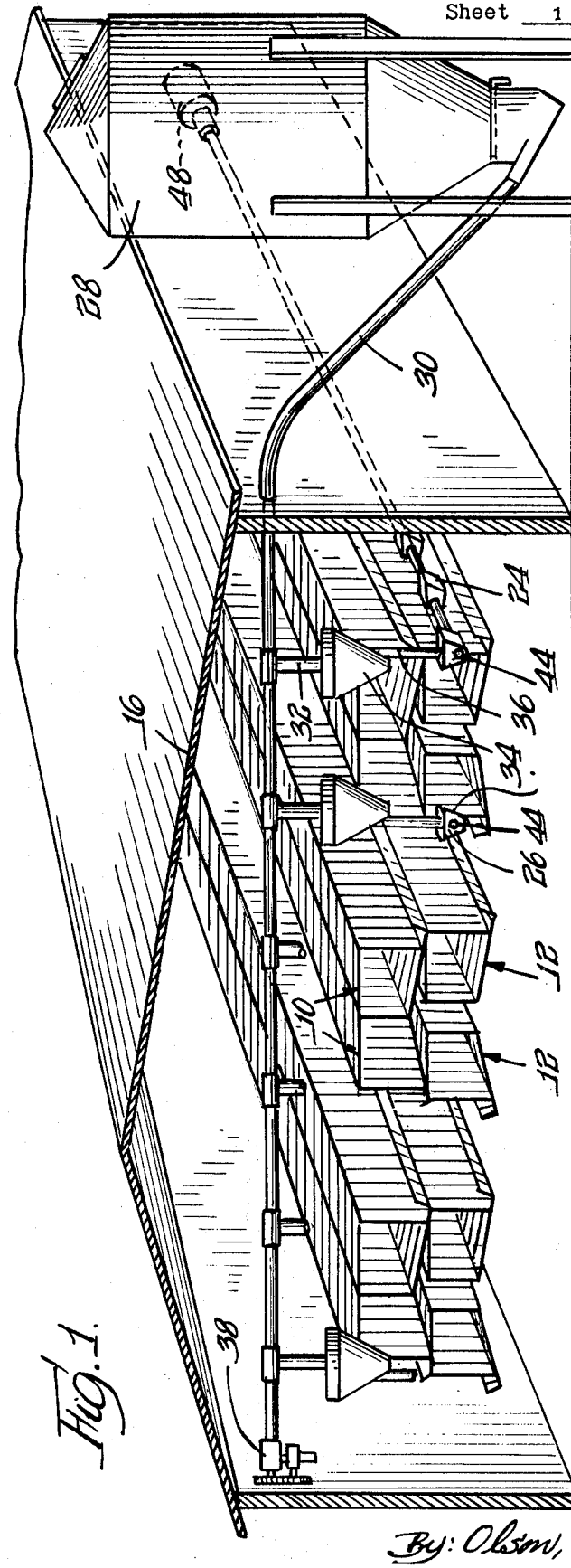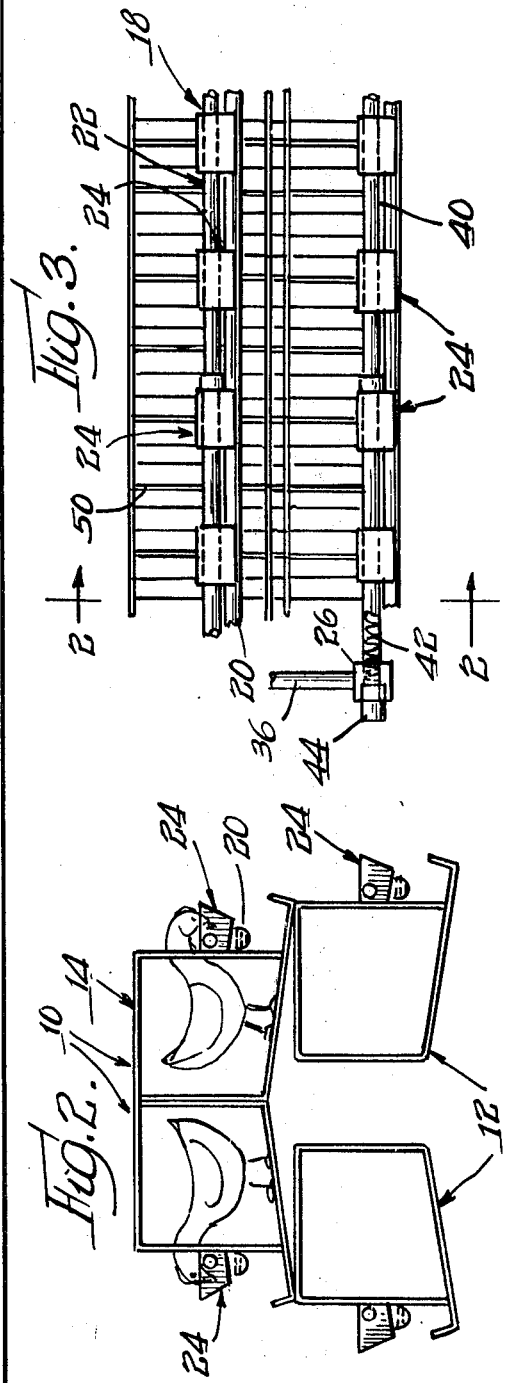

Patented Aug. 11, 1970 3,523,519
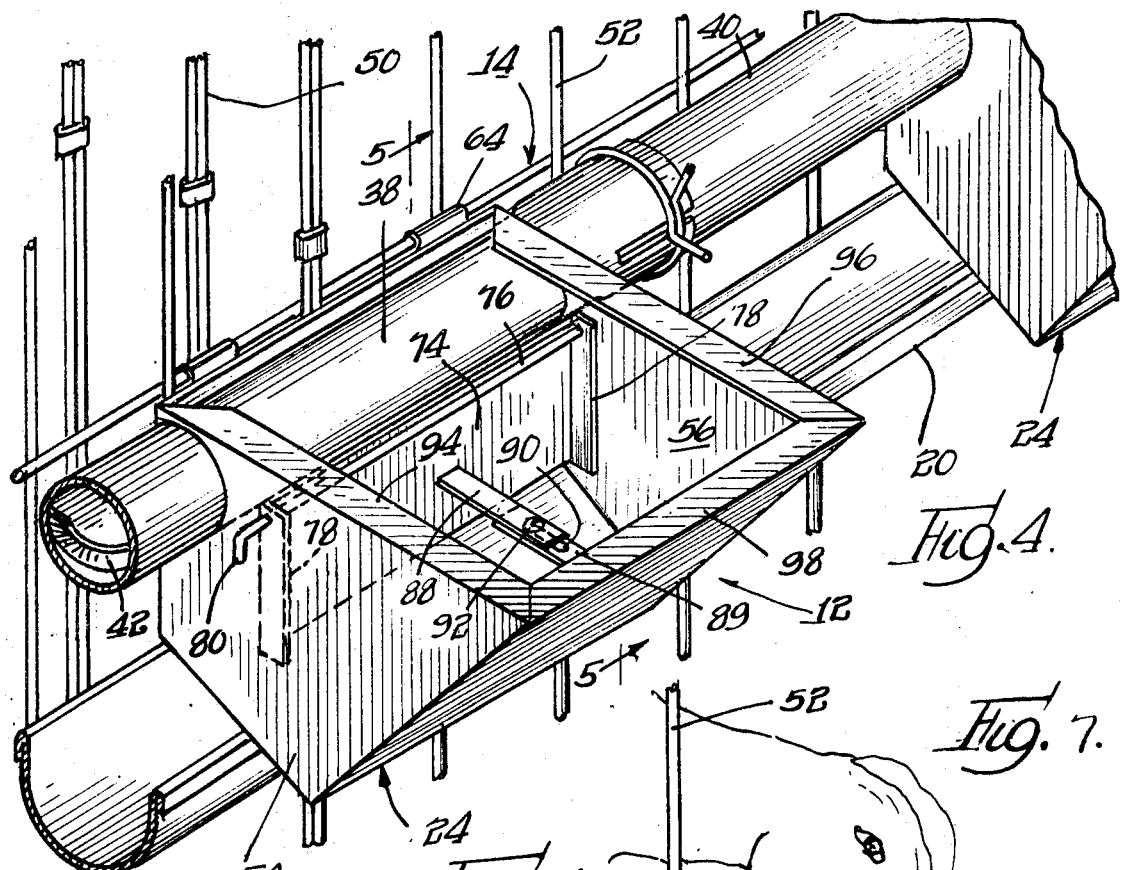
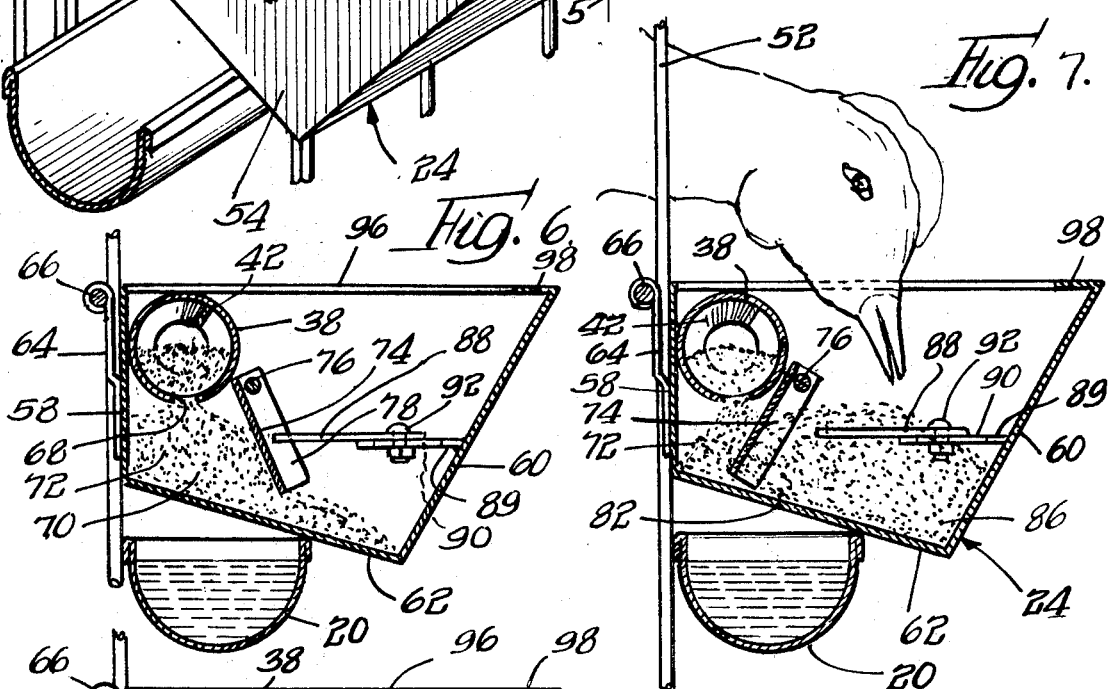
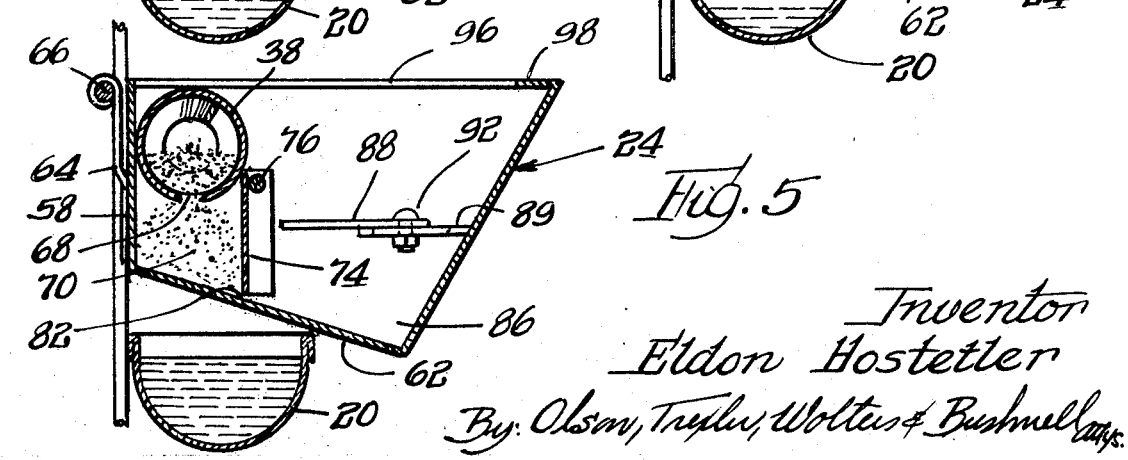
Inventor
Eldon Hostetler
By Olson, Trexler, Wolters & Bushnell
attys.

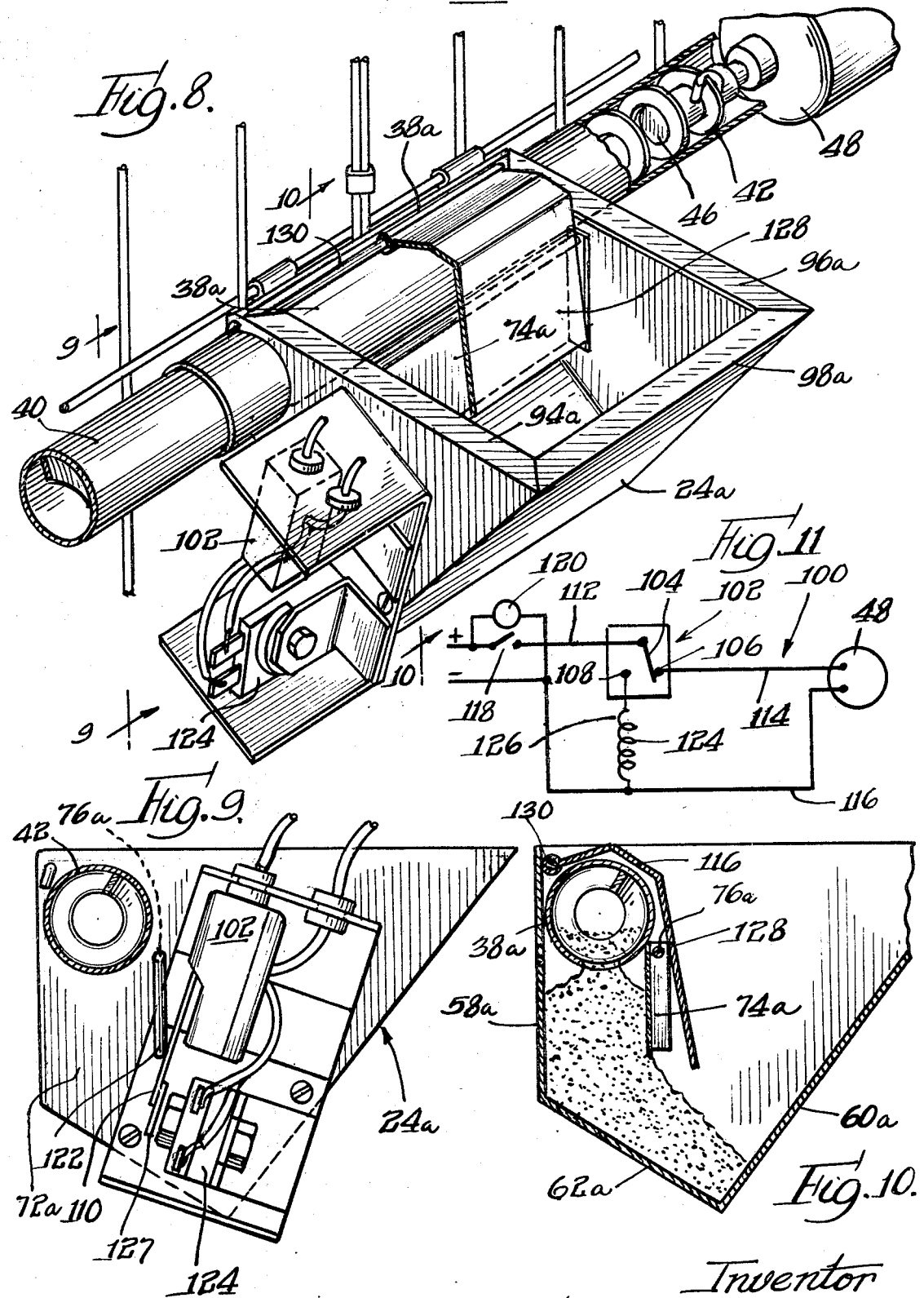

3,523,519

POULTRY FEEDING APPARATUS

The present invention relates to a novel feeding apparatus, and more specifically to a novel poultry feeder.

In many poultry operations, it is the general practice to keep the birds in cages. The cages are usually arranged in long rows throughout the poultry house. In these installations it is, of course, necessary to deliver food and water to the cages. A variety of proposals have heretofore been made for delivering feed to cages. Such proposals have not been entirely satisfactory in that some have contemplated manual feeding and others have utilized mechanical feeding equipment which is relatively complicated and expensive or difficult to adapt to a variety of cage arrangements, or wasteful of feed, or incapable of delivering a clean uniform mixture of feeds to all birds.

It is an important object of the present invention to provide a novel poultry feeder capable of delivering a clean uniform quantity of feed throughout the length of a feeding line and for depositing the feed in dispensing trays or containers spaced along the line in a manner such that the birds will have ready access to a quantity of the feed in the containers but will be prevented from obtaining excess feed in the containers and wasting feed.

A more specific object of the present invention is to provide a novel poultry feeder especially suitable for assembly association with a row of bird cages for accomplishing more uniform and efficient feeding of the birds.

Still another important object of the present invention is to provide a novel system for feeding and permitting watering of birds in cages in a relatively simple and economical manner.

A more specific object of the present invention is to provide a novel poultry feeder having a dispensing tray or container for receiving feed from a conveyor and including control means shiftable in response to the birds scratching feed into the bottom of a container for preventing the entry of excess feed into the container.

Other objects and advantages of the present invention will become apparent from the following description and the accompanying drawings wherein:

FIG. 1 is a simplified perspective view showing a poultry house having rows of bird cages mounted therein and feeding and watering means constructed in accordance with features of the present invention;

FIG. 2 is a simplified sectional view taken along line 2-2 in FIG. 3;

FIG. 3 is a simplified fragmentary side view showing a portion of the cage and feeding apparatus installation;

FIG. 4 is an enlarged fragmentary perspective view showing a portion of the feeder installation and particularly one feed dispensing cup or container incorporating features of the present invention;

FIG 5 is a fragmentary sectional view taken generally along line 5-5 in FIG. 4;

FIGS. 6 and 7 are sectional views similar to FIG. 5, but showing the manner in which feed controlling baffle means operates for controlling the flow of feed into the cup or container;

FIG. 8 is a fragmentary perspective view showing an endmost feed dispensing cup or container and switch means associated therewith for controlling a conveyor driving motor incorporated in the apparatus of the present invention;

FIG. 9 and 10 are sectional views respectively taken along line 9-9 and line 10-10 in FIG. 8; and FIG. 11 is a schematic diagram showing a control circuit utilized in the feeder apparatus of the present invention.

Referring now more specifically to the drawings wherein like parts are designated by the same numerals throughout the various figures, a poultry installation incorporating features of the present invention is shown in FIG. 1. This installation comprises a plurality of upper and lower rows 10 and 12 of cages 14. The rows are mounted by a suitable means so as to extend longitudinally generally throughout the length of a poultry house 16. The cages are formed from wire or otherwise constructed in a known manner and are of a size to accommodate the desired number of birds. In most instances the number of birds inserted in each cage is small and may, for example, be only two or three.

A poultry feeder line 18 constructed in accordance with features of the present invention is mounted in association with each row of cages and watering troughs 20, of known construction, are also mounted in association with each row of cages beneath the feeding line. In general, each feeding line 18 comprises tubular feed conveying means 22 and feed dispensing cups or containers 24 spaced there along as will be described more in detail below. An upstream or feed entering end of the tubular conveying means 22 has a fitting or hopper 26 connected with a suitable source of feed supply.

In the embodiment shown, feed is supplied to each of the feeding lines from a bulk storage bin 28. A conveyor 30 delivers feed from the bulk conveyor to positions over each of the feeding lines from which feed is deposited through tubes 32 into hoppers 34 which are connected by tubes 36 with the small hoppers or fittings 26. The feed delivery or conveying means 30 is of known construction and may, for example, include an elongated flexible auger within a tube and driven by a motor 38.

The feed conveying means of each feeding line 18 comprises an elongated closed conduit or tube preferably comprising sections 38 extending through the feed dispensing cups or containers and telescoping sections 40 extending between the containers. A flexible feed advancing element 42 is disposed within the conduit or tube. More specifically, the feed advancing or conveying element 42 is in the form of an elongated flexible and resilient helical centerless auger. An upstream end of the auger is secured and rotatably anchored to a bearing 44 of known construction mounted in the fitting or small hopper 26. An opposite end of the auger is secured and anchored to an output shaft 46 of a combined motor and speed reducing unit 48 mounted at the downstream end of the tube or conduit means as shown in FIG. 8. The arrangement is such that the flexible spring-like auger is maintained under tension and in a stretched condition for minimizing localized stretching or compressing of the auger or, in other words, changes in the pitch of the coils which might cause clogging of the auger with feed.

As shown in FIGS. 3 and 4, the feed dispensing cups or containers 24 are spaced along the tube or conduit so that one cup is substantially centered with respect to abutting side walls 50 of adjacent cages 14 for permitting the birds from two side by side cages to eat from the same container. The conveying lines 18 are mounted along the front sides 52 of the cages which are formed by bars spaced sufficiently to enable the birds to have access to the containers. Furthermore, the containers 24 are spaced sufficiently from each other to enable the birds to reach therebetween for access to the watering trough 20.

As best shown in FIGS. 4- 7, each of the feed cups or containers 24 is formed with opposite end or side walls 54 and 56 and back and front side walls 58 and 60 extending therebetween. In addition, a bottom wall 62 extends between and is joined to the lower edges of all of the side walls. The cup or container may be suitably formed from a material such as sheet metal or molded from plastic.

The back wall 58 is disposed in a vertical plane for abutting the front sides 52 of the cages. Clips or brackets 64 are welded or otherwise secured to the back wall 58 for mounting the container on a wire or other element 66 of the cages.

As previously indicated, a section 38 of the feed conveying conduit or tube means extends through the cup or container. As shown in FIGS. 4-7 the tube section 38 extends through the opposite end walls 54 and 56 and is positioned substantially in abutting relationship to the back wall 58 and beneath the upper edges of the walls. An opening 68 is provided in the bottom of the tube section 38 for permitting feed 70 to fall into a space 72 within the container and immediately beneath the tube.

The space 72 is covered by the tube and the back is closed by the wall 58 for preventing direct access thereto by the birds. In addition, the space 72 is partially defined by a movable baffle 74 which extends between the walls 54 and 56 and is pivotally mounted adjacent its upper margin by a rod or pivot pin 76 positioned on an axis immediately adjacent to the tube section 38 and beneath a horizontal plane containing the axis of the tube for enabling the baffle to function in the manner described below. In the embodiment shown, the baffle 74 has opposite end flanges 78 slidably abutting opposite end walls 54 and 56 of the container and through which the pivot rod 76 extends. Ends 80 of the pivot rod project through the end walls of the container and are deflected laterally as shown in FIG. 4 for retaining the parts in assembled relationship.

When there is no feed in the dispensing cup or container, the baffle 74 hangs substantially vertically as shown in FIG. 5 for defining the outer side of the space 72. The baffle is constructed so that the lower edge 82 thereof is positioned slightly above the bottom of the container for defining a relatively narrow gap 84 therebetween. Upon entry of feed 70 into the space 72 through the opening 68 as shown in FIG. 6, the baffle 74 is initially pivoted outwardly by pressure from the feed so as to open the gap 84. This permits feed to flow beneath the lower edge of the baffle into an outer exposed space 86 in the lower portion of the container. This flow of the feed is facilitated by positioning the bottom 62 so that it extends downwardly and outwardly from the wall 58. Furthermore, the outer side wall 60 is inclined somewhat outwardly from the vertical so that it joins with the bottom 62 in providing the exposed feed receiving space 86 with a V-shaped bottom for accumulating a desired quantity of feed.

As feed flows naturally from beneath the baffle as shown in FIG. 6, the birds begin to work on the feed with their beaks in an attempt to drag an ever increasing pile of feed from beneath the lower edge of the baffle. However, the feed is delivered into the space 72 faster than the birds drag it out into the space 86. Thus, the space 72 is filled so that the opening 68 is blocked and the feed is directed successively to each container until all of the spaces 72 are filled. Then the conveyor auger is stopped by the control means described below. The birds continue to drag the feed outwardly until a quantity of feed 72 has been accumulated and built up in the space 86 along the outer side of the baffle as shown in FIG. 7. When this quantity of feed has built up to a substantial amount and the space 72 has been substantially emptied, the pressure supplied by the feed against the outer side of the baffle along with the action of the birds seeking to reach beneath the lower edge of the baffle for more feed, shifts the baffle from the position shown in FIG. 6 to the position shown in FIG. 7 so that the lower edge thereof is substantially against the bottom of the container and effectively shuts off the flow of feed from the space 72 to the space 86. It has been found that the baffle is effectively retained in this position until the birds consume a major portion of the feed from the space 86. The baffle is then free to return to the position shown in FIG. 5 and the cycle may be repeated.

With the feed controlling action of the baffle described above, assurance is provided that the bird will substantially eat each portion of feed before another portion is delivered into the exposed space 86. Furthermore, the construction is such that the birds may initially accumulate an adequate portion of feed in the space 86 while at the same time they are positively prevented from scratching out excess feed which might cause spilling and waste.

In order to aid in controlling the amount of feed which a bird may scratch from beneath the baffle, an abutment or stop element 88 is mounted in the container for engagement with the baffle as shown in FIG. 6. The support 89 for the abutment or stop element 88 is provided with an elongated slot 90 through which screw means 92 extends for adjustably securing the stop element. The element 88 extends across a mid portion of the container and also serves to prevent the birds in one cage from raking and piling the feed toward either end 54 or 56 in a manner causing spilling and/or to limit access to the feed by birds in the adjacent cage.

Spilling and waste of the feed is further inhibited by constructing the cup or container with inwardly projecting means at its upper margin. More specifically, inwardly directed flanges 94, 96 and 98 extend from the sides 54, 56 and 60. At the back side of the cup, the tube section 38 provides the inwardly projecting means for preventing the birds from scratching feed from the cup. At the same time, the rounded tube presents a smooth surface over which the birds reach as shown in FIG. 7 for minimizing any possibility of injury to the birds.

The installation is provided with suitable electrical circuitry for controlling the operation of the motor 38 of the conveyor for delivering feed from the bulk tank to the hoppers and for shutting off the motor when the hoppers are full. In addition, the installation is provided with suitable electrical circuitry for controlling the operation of the motors 48 of the feeder lines so as to convey feed from the hoppers to the dispensing cups or containers. While these electrical circuits may be modified in various known ways and need not be described in detail, one suitable electric circuit 100 for an individual feeder line is shown in FIG. 11.

In the circuit 100 it is contemplated that a switch 102 is connected with one of the dispensing cups or containers 24a as shown in FIGS. 8 and 9, which dispensing cup 24a is preferably located at the downstream end of the tube or conduit means adjacent the motor 48.

The cup 24a which may be designated as the control cup or container is similar to the previously described cups 24. However, in order to actuate the switch in the manner described below, the bottom is provided with a greater incline for promoting the outward flow of feed as shown in FIG. 10 and means is included for preventing the birds from pushing the baffle 74a inwardly.

The switch 102 is a singlepole, doublethrow snap acting switch of known construction including a movable contact 104 shiftable between fixed contacts 106 and 108 and adapted to be actuated by a lever arm 110. The movable contact 104 is connected with a source of electrical power by wire 112 and the contact 106 is connected by wire 114 with one terminal of the motor 48 which has its opposite terminal connected with a ground wire 116.

The switch 102 is constructed so that the movable contact 104 normally engages the contact 106 for energizing the motor circuit when there is no feed in the feeding cup 24a. However, a timer switch 118 is connected in the wire 112 in series with the switch 102 for preventing operation of the motor 48 until the timer switch 118 has been closed. The timer may be of known construction and need not be described in detail and preferably includes a timer motor 120 suitably connected in the electric circuit and operable for closing switch 118 at the desired time and maintaining the switch closed for the desired interval of time.

As shown in FIG. 9, the actuating lever 110 of the switch 102 is adapted to be engaged by a lever 122 which is secured to or formed integrally with one end of the baffle pivot rod 76a which is welded or otherwise secured to and moves in unison with the baffle 74a. The arrangement is such that when the feeding cup 24a is empty, the baffle and the lever arm 122 hang generally vertically downwardly as shown in FIG. 9. Upon filling of the container 24a, the baffle 74a and the arm 122 swing in a generally clockwise direction as viewed in FIG. 9 for engaging the switch arm 110. When the desired amount of feed has been accumulated in the container 24a, the switch arm 110 is pushed toward the right as viewed in FIGS. 9 and 10 sufficiently to cause the movable contact 104 to snap from the contact 106 for stopping the conveyor driving motor 48.

As previously indicated, the electric circuit includes a timer so that delivery of feed to the dispensing cups or containers can be accomplished only during a predetermined interval of time. However, it is usually desired to permit the filling of the cups or containers only once during this interval of time. Since it is possible for the birds feeding from the control cup or container 24a to empty the cup before many of the other cups along the line are emptied and while the timer switch 118 is still closed, the electric circuitry is provided with means for permitting the conveyor motor 48 to be energized only once during any given interval of time in which the timer switch 118 is closed. More specifically, an electromagnet 124 is connected in a wire 126 which extends between the contact 108 and the ground wire 116. The switch 102 is constructed so that when the arm 110 is actuated by the baffle responsive arm 122 to shift the contact 104 from the contact 106, the contact 104 is snapped into engagement with the contact 108 for completing the circuit through the coil 124. The switch arm 110 carries a pad 127 of magnetic material as shown in FIG. 9 so that when the coil 124 is energized, the switch arm 110 is magnetically held. This condition continues until the timer switch 118 is opened at which time the coil 124 is deenergized and the spring biased switch contact 104 is shifted back into engagement with the contact 106. Thus the circuit is conditioned for reenergizing the conveyor motor 48 the next time the timer switch 118 is closed.

It is noted that the control feed dispensing cup or container structure 24a differs from the remaining cup or container units 24 in that it is adapted to cause feed entering the container to force the baffle 74a outwardly and retain it outwardly when the desired amount of feed has been accumulated within the container in order to actuate the switch arm 110 in the manner described above. In other words, the cup or container unit 24a is constructed for preventing the birds from forcing the baffle 74a inwardly to shut off the flow of feed as is done in the remaining cups or containers 24 in the manner shown in FIG. 7. Thus, the dispensing cup or container 24a is provided with another fixed baffle 128 positioned outwardly of the baffle 74a on rod 130 and adapted to prevent the birds from forcing the baffle 74a inwardly or from scratching an excess of feed from the container.

While a preferred embodiment of the present invention has been shown and described herein, it is obvious that many structural details may be changed without departing from the spirit and scope of the appended claims.

I claim:

1. A poultry feeding apparatus comprising a feed dispensing container adapted to receive feed from a source of supply, and shiftable baffle means positioned in said container for initially permitting entry of feed and permitting birds to move a quantity of feed from one side of the baffle means to an exposed position, said baffle means being responsive to a buildup of said quantity of feed for automatically shifting for substantially restricting further entry of feed into the container until said quantity of feed has been substantially removed whereupon said baffle means automatically shifts for permitting entry of additional feed into the container, means defining a feed receiving opening directed into said container at said one side of the baffle means and substantially covering said container at said one side of the baffle means for preventing the birds from having direct access to the feed entering the container, said baffle means comprising a hanging baffle member, and means pivotally supporting said baffle member for movement about a generally horizontal axis away from and toward the covered portion of the container, said container comprising generally V-shaped bottom means outwardly of said baffle member from the covered portion of the container for aiding in the buildup of said quantity of feed.

2. An apparatus, as defined in Claim 1, wherein said generally V-shaped bottom means includes an inclined portion extending beneath said baffle member and providing the bottom of said covered container portion, said baffle member having a lower edge located slightly above said inclined bottom portion when the baffle member is hanging in a generally vertical position.

3. An apparatus, as defined in Claim 1, wherein said container has one upstanding side adapted substantially to abut a cage for poultry to be fed, said covered portion of the container being located at said one side.

4. A poultry feeding apparatus comprising a feed dispensing container adapted to receive feed from a source of supply, and shiftable baffle means positioned in said container for initially permitting entry of feed and permitting birds to move a quantity of feed from one side of the baffle means to an exposed position, said baffle means being responsive to a buildup of said quantity of feed for automatically shifting for substantially restricting further entry of feed into the container until said quantity of feed has been substantially removed whereupon said baffle means automatically shifts for permitting entry of additional feed into the container, means defining a feed receiving opening directed into said container at said one side of the baffle means and substantially covering said container at said one side of the baffle means for preventing the birds from having direct access to the feed entering the container, said container being adapted to be positioned for permitting access by poultry to be fed from one side thereof, and said means defining a feed opening and covering a portion of the container comprising a feed conveying tube traversing said container adjacent one side of said container, said tube having an opening in a lower portion thereof.

5. An apparatus, for installation and association with a row of poultry cages comprising a plurality of structures as defined in claim 4 spaced along said row of cages, tubing means connecting the tubes extending through each of the containers, and means for conveying feed through said tubing means and tubes for filling all of the containers.

6. An apparatus, as defined in Claim 5, which includes poultry watering means extending along said row of cages and having portions thereof exposed between the feed dispensing containers for access thereto by the birds.

7. An apparatus, as defined in Claim 5, wherein each feed dispensing container is positioned in overlapping relationship with only two of said cages.

8. An apparatus, as defined in Claim 5, which includes motor means for driving the means for conveying feed through the tubes, a switch mounted in association with one of said containers and connected with said motor means, and means extending between said switch and the baffle member within said one container for actuating the switch in response to the presence of feed in said one container for stopping said motor means.

9. An apparatus, as defined in Claim 8, which includes additional baffle means in said one container for preventing said baffle member of the one container from being shifted inwardly to shut off the flow of feed into said one container whereby to insure operation of the switch means in response to outward movement of said last mentioned baffle member.

10. An apparatus for feeding poultry comprising elongated feed conduit means, means for conveying feed through said conduit means, said conduit means having feed discharge openings at spaced intervals therealong, feed dispensing containers associated with said conduit means in registration with said openings for receiving feed falling from the openings, and baffle means movably mounted in each of said containers for initially permitting a quantity of feed to enter the containers and for then moving to restrict entry of feed until a substantial portion has been removed by the birds, said removal of the feed permitting the baffle means to shift for permitting additional feed to enter the containers.

11. An apparatus, as defined in Claim 10, wherein said conduit means traverses each of said containers adjacent one side thereof, and said baffle means in each of said containers comprises a hanging baffle member, and means pivotally supporting said baffle member adjacent said conduit means.

12. An apparatus, as defined in Claim 11, wherein said one side of each of said containers is upstanding and adapted to substantially abut a poultry cage, and each of said containers includes a bottom inclined downwardly and outwardly from said one side and beneath said baffle member.

13. An apparatus, as defined in Claim 11, wherein said conduit means is rounded for minimizing any possibility of injury to birds reaching over the conduit means for feed in the containers.

14. An apparatus as defined in Claim 13, wherein each of said containers includes inwardly projecting flange means along upper portions of its sides other than said one side.